United States Patent
Puhakainen

(10) Patent No.: US 6,735,564 B1
(45) Date of Patent: May 11, 2004

(54) PORTRAYAL OF TALK GROUP AT A LOCATION IN VIRTUAL AUDIO SPACE FOR IDENTIFICATION IN TELECOMMUNICATION SYSTEM MANAGEMENT

(75) Inventor: Pekka Puhakainen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/720,660

(22) PCT Filed: Apr. 26, 2000

(86) PCT No.: PCT/FI00/00358
§ 371 (c)(1),
(2), (4) Date: Dec. 28, 2000

(87) PCT Pub. No.: WO00/67502
PCT Pub. Date: Nov. 9, 2000

(30) Foreign Application Priority Data

Apr. 30, 1999 (FI) .................................................. 990996

(51) Int. Cl.[7] .............................................. G10L 15/00
(52) U.S. Cl. ..................... 704/246; 704/260; 704/270.1; 704/278
(58) Field of Search ................................. 704/246, 231, 704/236, 260, 270.1, 278; 381/17; 455/67.1, 508, 518

(56) References Cited

U.S. PATENT DOCUMENTS

| | | | | |
|---|---|---|---|---|
| 5,230,078 A | * | 7/1993 | Varela et al. ............... | 455/67.1 |
| 5,438,623 A | * | 8/1995 | Begault ....................... | 381/17 |
| 5,561,736 A | * | 10/1996 | Moore et al. ............... | 704/260 |
| 5,930,723 A | * | 7/1999 | Heiskari et al. ............ | 455/518 |
| 5,999,820 A | * | 12/1999 | Sutanto et al. .............. | 455/508 |

FOREIGN PATENT DOCUMENTS

| WO | WO 95/31881 | | 11/1995 | |
|---|---|---|---|---|
| WO | WO 98/49842 | * | 11/1998 | ............ H04Q/7/00 |

OTHER PUBLICATIONS

Naps et al ("Using the WWW as the Delivery Mechanism for Interactive, Visualization–Based Instructional Modules", Report of the ITiCSE '97 Working Group on Visualization, Jun. 1997).*

Greenhalgh et al ("Massive: A Collaborative Virtual Environment for Teleconferencing", ACM Transactions on Computer–Human Interaction, Sep. 1995).*

* cited by examiner

Primary Examiner—Richemond Dorvil
Assistant Examiner—Daniel Nolan
(74) Attorney, Agent, or Firm—Pillsbury Winthrop LLP

(57) ABSTRACT

A method and arrangement for managing talk groups of a telecommunication system at a dispatcher station of the telecommunications system having one or more talk groups which may consist of one or more users and which are controlled by the dispatcher at the dispatcher station. The arrangement includes a two-channel or a multichannel sound reproducing system which is configured to create an artificial acoustic space at the dispatcher station, and reproduce voices of each talk group so that the voices are heard from a certain point of the acoustic space, which allows the dispatcher to recognize the talk group to which the voice belongs on the basis of the location of the voice.

11 Claims, 1 Drawing Sheet

PORTRAYAL OF TALK GROUP AT A LOCATION IN VIRTUAL AUDIO SPACE FOR IDENTIFICATION IN TELECOMMUNICATION SYSTEM MANAGEMENT

BACKGROUND OF THE INVENTION

The invention relates to management of talk groups in a telecommunications system at the dispatcher station of the telecommunications system.

The method according to the invention is intended for use particularly in PMR (Private Mobile Radio or Professional Mobile Radio) networks, i.e. in trunking networks, which are typically company networks or authority networks in which all channels are used by one or more companies or authorities. In these networks the subscribers have, in addition to their personal subscriber numbers, group numbers which indicate the group call group (talk group) to which the subscriber in question belongs so that calls intended for all subscribers of the group concerned can be transmitted to the subscribers of this group.

Group call is one of the most important functions of the PMR network. The group call is used e.g. in all kinds of activities in which several persons participate, particularly when the whole group needs to be aware of the course of events all the time. The group call is a conference call during which all participants may speak in turn and listen to each other. In group calls the whole group is called with one call number.

Here a call or a group call refers to complete information exchange between two or more parties. The call may consist of one or more turns.

One example of a digital radio telephone or a mobile communication system in which the present invention can be applied is the TETRA system (Terrestrial Trunked Radio). In the TETRA system management of talk groups belongs to the responsibilities of a dispatcher. The dispatcher can perform different control functions related to talk groups and individual talk group users, i.e. subscribers. The dispatcher may, for example, create talk groups, change the composition of talk groups, add users to the system or change the users' priority information. The dispatcher has a dispatcher workstation DWS at his disposal from which he receives all the information needed for managing talk groups. The workstation usually comprises a display and sound reproducers, e.g. headphones.

The problem associated with the system described above is that the dispatcher must look at the display to find out the group (or user) to which the talk heard at a given time belongs if the dispatcher does not recognize the speaker because the voices of all talk groups and subscribers are heard from the same source. One prior art solution to this problem is to use several sound reproducers, e.g. loudspeakers, so that the talk of one group is heard from a certain loudspeaker. The problem of this arrangement is that it requires several loudspeakers. Furthermore, if one wants to change the place from which the sound is heard, the physical location of the loudspeakers has to be changed.

BRIEF DESCRIPTION OF THE INVENTION

The object of the invention is to provide a method and an arrangement implementing the method to solve the above-mentioned problems. The objects of the invention are achieved with a method of managing talk groups of a telecommunications system at the dispatcher station of the telecommunications system which comprises one or more talk groups which may consist of one or more users and which are controlled by a dispatcher at the dispatcher station, the system being characterized by creating an artificial acoustic space at the dispatcher station by means of a two-channel or a multichannel sound reproducing system and reproducing the voices of each talk group from a certain position of the acoustic space so that the dispatcher can recognize the talk group to which the voice belongs on the basis of the location of the voice. The preferred embodiments of the invention are disclosed in the dependent claims.

The invention is based on the idea of creating an acoustic impression of space artificially by means of a two-channel or a multichannel sound reproduction system, e.g. by loudspeakers or headphones, so that the voices belonging to different talk groups or users are heard from different positions at the dispatcher station. The acoustic space can be created e.g. as a three-dimensional space in which case voices can be arranged so that they are heard from any point of the dispatcher station.

An advantage of the method and arrangement of the invention is that the dispatcher can conclude the talk group or the user to which/whom the voice belongs on the basis of the virtual location of the voice. Thus the dispatcher does not need to look at the display to obtain this information.

The invention also relates to an arrangement for managing talk groups of a telecommunications system at the dispatcher station of the telecommunications system which comprises one or more talk groups which consist of one or more users and which are controlled by a dispatcher at the dispatcher station, the arrangement being characterized in that it comprises a two-channel or a multichannel sound reproducing system which is arranged to create an artificial acoustic space at the dispatcher station and reproduce the voices of each talk group so that they are heard from a certain point of the acoustic space and the dispatcher can recognize the talk group to which the voice belongs on the basis of the location of the voice. This kind of arrangement provides a simple solution for achieving the advantages of the method of the invention.

BRIEF DESCRIPTION OF THE DRAWINGS

The invention will be described in greater detail by means of preferred embodiments with reference to the accompanying drawings, in which.

DETAILED DESCRIPTION OF THE INVENTION

The invention is applicable both to digital and analogue mobile communication systems. The invention can also be used in fixed telecommunications networks, such as the PSTN (Public Switched Telephone Network).

Figure 1:
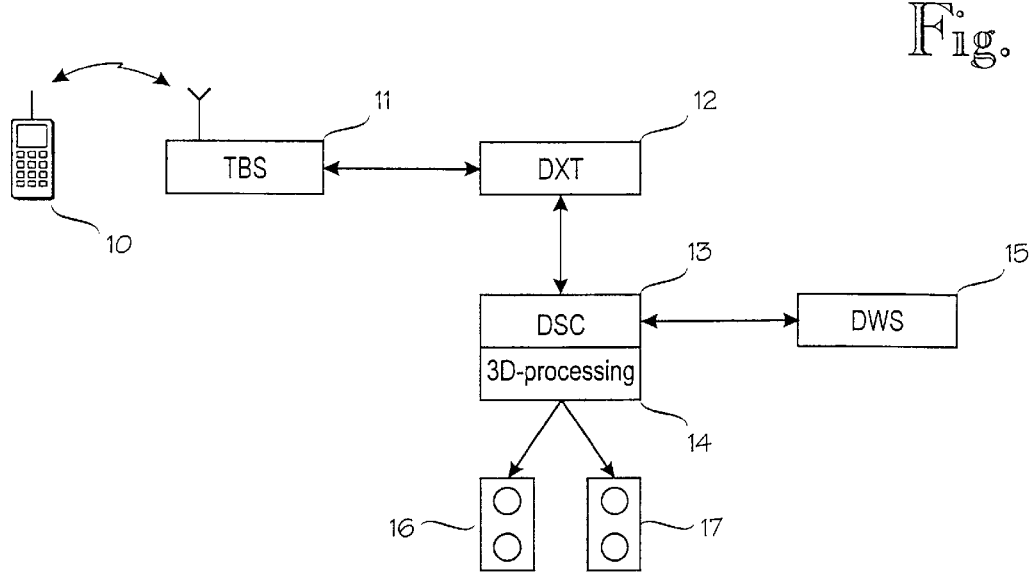
FIG. 1 is a chart of a telecommunications system according to a preferred embodiment of the invention.

FIG. 1 illustrates a mobile communication system according to an embodiment of the invention. The fact that the network elements mentioned in FIG. 1 are elements of the TETRA system does not by any means limit the application of the invention to other telecommunications systems. It should be noted that the figure illustrates only the elements necessary for understanding the invention and the structure of the system may vary from what has been shown, which does not affect the basic idea of the invention. It is also important to note that in a real mobile communication system the number of each element may be greater than in FIG. 1. In FIG. 1 the user of the telecommunications network, i.e. the subscriber 10, communicates with a base station 11 (TBS, TETRA Base Station). The base station 11 further communicates with an exchange 12 (DXT, Digital Exchange for TETRA). The exchange 12 is connected to a dispatcher system which consists of a dispatcher station controller DSC 13 and a dispatcher workstation DWS 15 connected thereto. A dispatcher 30 (shown only in FIG. 2) controls the calls of users 10 and talk groups 20 to 26 (shown only in FIG. 2) and other functions via the workstation 15. In FIG. 1 there is also a 3D (three dimensional) processing unit 14 connected to the dispatcher station controller 13. The 3D processing unit 14 controls sound reproducers 16 and 17. The sound reproducers 16 and 17 may be e.g. loudspeakers or headphones and the number of sound channels may vary without affecting the basic idea of the invention. The sound reproducers 16 and 17 may also contain e.g. a sound signal amplifier. The sound signal amplifier can also be included in the 3D processing unit 14, for example.

The method according to the preferred embodiment of the invention functions as follows: the dispatcher station controller 13 receives a TETRA-coded sound signal (e.g. speech) from the exchange 12 and decodes it into a mono signal. The 3D processing unit 14 converts the mono signal into a stereo signal so that when the voice is heard via the sound reproducers 16 and 17, it seems to be coming from a certain point of the artificial acoustic space. In other words, the dispatcher station is provided with an artificial acoustic space, i.e. a sound space, and sounds coming from different sources can be located at different points of the space. The workstation 15 always has information on to which talk group 20 to 26 or user 10 the voice belongs and it controls the 3D processing unit 14 on the basis of this information so that the processing unit places the voice at a certain point in the artificial acoustic space. Depending on how 3D processing 14 is implemented, the control information given to the 3D processing unit 14 by the workstation 15 may be e.g. information on the coordinates where the sound is to be placed in the acoustic space. Alternatively, the workstation 15 may calculate an HRTF (Head Related Transfer Function) value for each sound and supply it to the 3D processing unit 14, which decreases the number of calculations needed in the 3D processing unit 14. The HRTF tells how the sound spectrum changes as the sound passes from the external ear to the eardrum. This function tells how the amplitude and phase of the different frequency components of the sound change. This function is influenced by the acoustic properties of the outer auditory canal and the earlobe. The shape of the earlobe is asymmetric. Passing of the sound through the outer auditory canal generates resonance and delay that would be dependent on the frequency and diffraction. These factors determine the HRTF. The HRTF changes the sound spectrum in a manner determined by the incoming direction of the sound. Thanks to this, the listener can sense the direction from which the sound comes. Each person has an individual shape of the earlobe. Consequently, all persons do not have exactly the same HRTF, i.e. it is also individual. Thus the average HRTF is used as the model when three-dimensional sound reproduction is to be created. This non-individual HRTF is determined by measuring the HRTF from a large number of people. Thereafter the average of these HRTFs is calculated. This average HRTF can be used as the model in the implementation of a three-dimensional virtual sound world.

The average HRTF is not as accurate as the individual HRTF but in practice it works rather well for most people. Depending on the capacity of the 3D processing unit 14, it may process voices of one or more radio channels (or e.g. voices of an individual user). After 3D processing the sounds of the channels are added up for reproduction 16 and 17. If the capacity of the 3D processing unit 14 is not sufficient for processing several channels, some channels may be, if necessary, combined by adding them up already in the monosignal phase before 3D processing 14. Implementation of 3D processing 14 may differ from the above without deviating from the inventive concept. The 3D processing 14 may be connected to speech decoding of the dispatcher station controller 13, and thus both functions are carried out by the same DSP (Digital Signal Processor) unit, for example.

Figure 2:
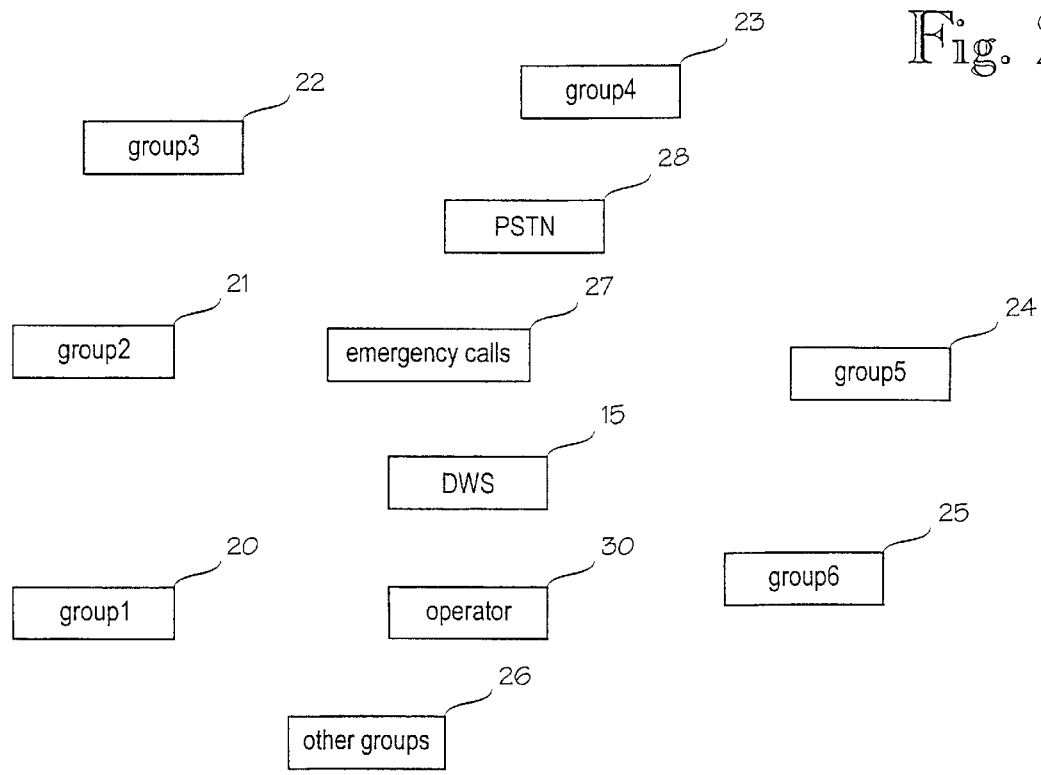
FIG. 2 is a chart of the grouping of talk groups at the dispatcher station.

FIG. 2 shows an example of the artificial acoustic space which is created around the dispatcher 30 and the dispatcher workstation 15. For the sake of clarity, the figure is illustrated as a two-dimensional view from the top. Different talk groups 20 to 26 are placed in different positions of the acoustic space so that the dispatcher 30 can conclude the talk group 20 to 26 to which the sound (e.g. speech) belongs on the basis of the location of the sound. The acoustic space also comprises separate positions for a group 26 consisting of several talk groups, for a fixed telephone line 28 and for emergency calls 27. FIG. 2 shows only one example of how talk groups 20 to 26 can be located in the artificial acoustic space. According to a preferred embodiment of the invention, the locations of the talk groups 20 to 26 and other sounds 27 to 28 can be changed with software by the dispatcher 30, for example. Also, individual users 10 may be provided with locations of their own in the acoustic space. The talk groups 20 to 26 or users 10 need not be statically bound to any fixed point of the acoustic space but the location of the sounds can be changed e.g. according to the situation. Emergency calls 27 or similar calls belonging to a specific group may be placed, if necessary, at a certain point of the acoustic space, regardless of the talk group 20 to 26 or the user 10 to which/whom they belong. According to the preferred embodiment, the dispatcher 30 may log into a talk group 20 to 26 so that the voices of individual users of the talk group are heard from different positions of the acoustic space.

The dispatcher 30 can control the location of the different talk groups 20 to 26 in the sound space e.g. via the graphic interface of the workstation 15. The interface is used for displaying active talk groups and calls as well as other information e.g. according to FIG. 2. When the dispatcher 30 wishes to change the location of the talk group in the sound space, he may e.g. move the icon corresponding to the talk group on the display of the workstation 15 (not shown separately) or the location of a similar symbol to the desired spot on the display. The workstation 15 converts the location of the icon on the display into new parameters of the 3D processing unit which correspond to this location in the sound space. As a result of this, the talk group moves to the desired position in the sound space. In other words, all sound signals of the talk group concerned are processed so that they are heard from the new location.

When the dispatcher 30 wishes to "go into" a talk group, he may e.g. double-click the icon of the group in question with the cursor, in which case the individual members or calls of the group appear on the display in different positions, like talk groups 20 to 26 in FIG. 2. In that case the voices of different members or sounds of calls of the talk group are heard from the different positions of the sound space. When the dispatcher 30 monitors one talk group more closely in the manner described above, he does not preferably hear the voices of other talk groups.

The preferred embodiment of the invention described above, in which a three-dimensional acoustic space is created and reproduced by means of two sound reproducers 16 and 17, is advantageous because the dispatcher 30 may use e.g. conventional stereo headphones as the sound reproducers 16 and 17. This allows several dispatchers 30 to work in the same physical space at the dispatcher station without disturbing one another. Alternatively, loudspeakers, for example, can be used as the sound reproducers 16 and 17. It will be obvious to a person skilled in the art that the acoustic space can also be created by means of more than two sound channels and that the sound space may also be two-dimensional or three-dimensional. A one-dimensional acoustic space can be created e.g. by means of a conventional stereo system, which allows to place the sounds 20 to 28 separate from one another one-dimensionally. Creation of a one-dimensional acoustic space requires less calculation capacity than creation of a three-dimensional acoustic space but in the three-dimensional acoustic space the sounds 20 to 28 can be placed more freely.

It will be obvious to a person skilled in the art that as the technology advances, the inventive concept can be implemented in various ways. Thus the invention and its embodiments are not limited to the examples described above, but they may vary within the scope of the claims.

What is claimed is:

1. A method of managing talk groups of a telecommunications system at a dispatcher station of the telecommunication system having one or more talk groups which comprise one or more users and which are controlled by a dispatcher at the dispatcher station, the method comprising:

creating an artificial acoustic space at the dispatcher station by means of a two-channel or a multichannel sound reproducing system; and reproducing voices of one or more of the talk groups so that the voices are heard from a certain point of the acoustic space to permit the dispatcher to recognize a particular talk group to which the voice belongs based upon a location of the voice; and reproducing voices of a call belonging to a certain predetermined call type so that the voices are heard from the same point of the acoustic space regardless of the talk group to which the call belongs.

2. The method of claim 1, further comprising reproducing voices of one or more users of the one or more talk groups so that the voices are heard from a certain point of the acoustic space to permit the dispatcher to recognize a user of the one or more talk groups based upon a location of the voice.

3. The method of claim 1, wherein the dispatcher defines the voices of different talk groups and/or different users of a talk group so that the voices are heard from points of the acoustic space designated by the dispatcher.

4. The method of claim 1, wherein the predetermined call type is an emergency call.

5. The method of claim 1, wherein the acoustic space is three-dimensional.

6. An arrangement for managing talk groups of a telecommunication system at a dispatcher station of the telecommunication system having one or more talk groups which consist of one or more users and which are controlled by a dispatcher at the dispatcher station, the arrangement comprising:

a two-channel or a multichannel sound reproducing system configured to create an artificial acoustic space at the dispatcher station; and a mechanism configured to reproduce voices of one or more of the talk groups so that they are heard from a certain point of the acoustic space to permit the dispatcher to recognize a particular talk group to which a voice belongs based upon the location of the voice; and a mechanism configured to reproduce voices of a call belonging to a certain predetermined call type so that the voices are heard from the same point of the acoustic space regardless of the talk group to which the call belongs.

7. The arrangement of claim 6, further comprising a mechanism configured to reproduce voices of one or more users of the one or more talk groups so that the voices are heard from a certain point of the acoustic space to permit the dispatcher to recognize a user of the one or more talk groups based upon a location of the voice.

8. The arrangement of claim 6, further comprising a mechanism configured to allow the dispatcher to define the voices of different users of different talk groups or of a talk group so that the voices are heard from designated points of the acoustic space.

9. The arrangement of claim 6, wherein the predetermined call type is an emergency call.

10. The arrangement of claim 6, wherein the acoustic space is three-dimensional.

11. An arrangement for managing talk groups of a telecommunication system at a dispatcher station of the telecommunications system having one or more talk groups which consist of one or more users and which are controlled by a dispatcher at the dispatcher station, the arrangement comprising:

a two-channel or a multichannel sound reproducing system configured to create an artificial acoustic space at the dispatcher station;

a mechanism configured to reproduce voices of one or more of the talk groups and/or one or more of the users so that they are heard from a certain point of the acoustic space to permit the dispatcher to recognize a particular talk group and/or a particular user to which/whom a voice belongs based upon the location of the voice; and a mechanism configured to reproduce voices of a call belonging to a certain predetermined call type so that the voices are heard from the same point of the acoustic space regardless of the talk group and/or user to which/whom the call belongs.

* * * * *